United States Patent
Crosby

(10) Patent No.: US 7,040,079 B2
(45) Date of Patent: May 9, 2006

(54) RAKE WITH FOUR-WHEEL STABILIZING SYSTEM

(76) Inventor: Harvey J. Crosby, 1021 W. Veterans Hwy., Jackson, NJ (US) 08527

(*) Notice: Subject to any disclaimer, the term of this patent is extended or adjusted under 35 U.S.C. 154(b) by 0 days.

(21) Appl. No.: 10/884,908

(22) Filed: Jul. 6, 2004

(65) Prior Publication Data

US 2006/0005524 A1    Jan. 12, 2006

(51) Int. Cl.
*A01D 76/00* (2006.01)

(52) U.S. Cl. .................................. 56/384; 56/DIG. 10

(58) Field of Classification Search .................. 56/384, 56/385, 16.2, DIG. 10, 8, 14.7; 460/1
See application file for complete search history.

(56) References Cited

U.S. PATENT DOCUMENTS

| | | | | |
|---|---|---|---|---|
| 359,355 | A * | 3/1887 | Hinchman | 172/415 |
| 1,896,234 | A * | 2/1933 | Hathorn | 244/109 |
| 2,065,733 | A | 12/1936 | Pearson | |
| 2,384,685 | A * | 9/1945 | Koehler | 171/99 |
| 2,488,938 | A * | 11/1949 | Rodefeld | 414/442 |
| 2,667,730 | A * | 2/1954 | McCall et al. | 56/376 |
| 2,798,354 | A * | 7/1957 | O'Brien et al. | 56/235 |
| 2,888,088 | A * | 5/1959 | Claas et al. | 180/55 |
| 3,272,362 | A * | 9/1966 | Lamer et al. | 414/461 |
| 3,478,828 | A * | 11/1969 | Hansen | 172/669 |
| 3,690,055 | A | 9/1972 | Reber | |
| 3,964,565 | A * | 6/1976 | Cagle et al. | 180/340 |
| 4,396,069 | A * | 8/1983 | Ferber et al. | 172/310 |
| 4,510,742 | A * | 4/1985 | Lypka | 56/384 |
| 4,945,996 | A | 8/1990 | Codding | |
| 5,463,855 | A * | 11/1995 | Johnson et al. | 56/17.2 |
| 5,862,659 | A * | 1/1999 | Aron | 56/367 |
| 6,216,796 | B1 | 4/2001 | Frank et al. | |

FOREIGN PATENT DOCUMENTS

DE    199 53 267 A1    5/2001
JP    2000-316337    11/2000

* cited by examiner

*Primary Examiner*—Meredith C. Petravick
(74) *Attorney, Agent, or Firm*—Lucas & Mercanti, LLP

(57) ABSTRACT

A rake has two side members attached perpendicularly to the rake so as to form an H-shaped frame system. A swivelable wheel is mounted at each corner of the frame. The frame fully stabilizes the rake in a position approximately level with a ground surface as the rake is pulled across the ground by a tractor or other vehicle. The wheels are adjustable both vertically and horizontally by inserting or removing rings on a shaft holding each wheel, and by telescoping parts of the frame into each other. The invention is useful either as a combined rake/stabilizer system, or as a kit for retrofitting existing rakes.

2 Claims, 5 Drawing Sheets

RAKE WITH FOUR-WHEEL STABILIZING SYSTEM

BACKGROUND OF THE INVENTION

Rakes for landscaping, soil spreading, soil leveling and other purposes are commercially available. Typically, these rakes are designed to be pulled by a tractor or other vehicle. In the past, simply mounting a rake directly behind the tractor often presented problems because the tines of the rake simply continued to dig deeper and deeper into the ground as the tractor moved forward. Some have mounted one or two wheels behind the rake in an attempt to support and stabilize it. But this has also not proven to be satisfactory because it does not fully stabilize the rake. In particular, the system does not fully compensate for the motion of the tractor (or prevent the rake from being pulled in unexpected directions) as the tractor moves up and down over uneven ground.

For example, in the prior art, as shown in FIG. 1, if a two-wheel rear support system is used with a rake, and if one sets the wheels higher than the rake, then as the rake scrapes sand or dirt away, it leaves a void behind it, because the wheels cannot catch up to the rake. As a result, the rake keeps digging deeper. With the prior art two-wheel system, the operator cannot control the depth he or she wishes to rake. Therefore, the operator must set the depth for raking by using a three-point hitch or other attachment device on the tractor.

A problem with this arrangement is that the ability to rake smoothly depends solely on the tractor's ability to stay completely level, which it does not. The back wheels of the tractor become a pivot point like a seesaw. If the front wheels go over a bump or a high spot on the ground, it will raise the front of the tractor and lower the back, and the rake with it, causing the rake to dig in deeper. If the front wheels hit a rut or low spot, it causes the front of the tractor to dip down, raising up the rake, and dumping some of the material the operator is raking, which will create high spots and uneven ground.

Even in rakes having a third wheel mounted near the front of the rake, such as that shown in U.S. Pat. No. 4,945,996, the rake is not entirely stable relative to the ground because only the center portion of the rake is fully supported. Thus, tines near the ends of the rake have a tendency to be forced up and down as rocks or other hard debris pass under them or get stuck in the tines.

Therefore, a need exists for a system for fully stabilizing a tractor-pulled rake system so that raking may be done smoothly despite uneven ground conditions. A need also exists for a rake system that is easily removable from the tractor and easily adjustable for all types of soil conditions and raking applications.

SUMMARY OF THE INVENTION

The present invention solves the unmet needs of the prior art, and turns an ordinary landscape rake into a versatile, stable, and adjustable tool. It is excellent for raking riding arenas, raking debris from soil, spreading manure, top soil or compost, and numerous other applications.

In some broad aspects, the invention includes a system for stabilizing landscaping rakes or other tractor-pulled rakes. The system allows the rake to be mounted to two adjustable side members. After mounting, the assembly forms an H-shaped frame or rack having four corners. A wheel is mounted at each corner. The frame fully stabilizes the rake and maintains it in a position approximately level with a ground surface as the rake is pulled across the ground by a tractor or other vehicle. In some preferred aspects of the invention, the frame is adjustable horizontally in that parts of the frame may be telescoped into or out of other parts of the frame. In further aspects of the invention, the wheels are optionally adjustable vertically as well. In one embodiment of the invention, means are provided for adjusting the height by inserting or removing spacer rings on a shaft holding each wheel. The invention is useful either as a stand-alone, combined rake/stabilizer system, or as a kit that may be used to retrofit existing rakes.

More specifically, in one embodiment, the invention comprises a stabilized, wheeled rake comprising:

(a) a rake;

(b) two elongated side members mounted on either side of and perpendicularly to the rake, such that the side members and rake form an H-shaped frame with four corners, the frame suitable for attachment to a vehicle; and (c) four wheels, each wheel swivelably mounted at each corner of the frame, the wheels positioned such that the wheels and frame stabilize the rake in a position approximately level relative to a ground surface while the rake is being pulled across the ground surface by the vehicle.

In another embodiment, the invention comprises a stabilizing system for a rake, comprising:

(a) two elongated side members, each side member adapted to be mounted to a side of and perpendicularly to a rake; and (b) four wheels, each wheel swivelably mounted at an end of each side member, the wheels positioned such that the wheels and side members stabilize the rake in a position approximately level relative to a ground surface while the rake is being pulled across the ground surface by a vehicle.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which.

DETAILED DESCRIPTION OF THE INVENTION

Figure 4:
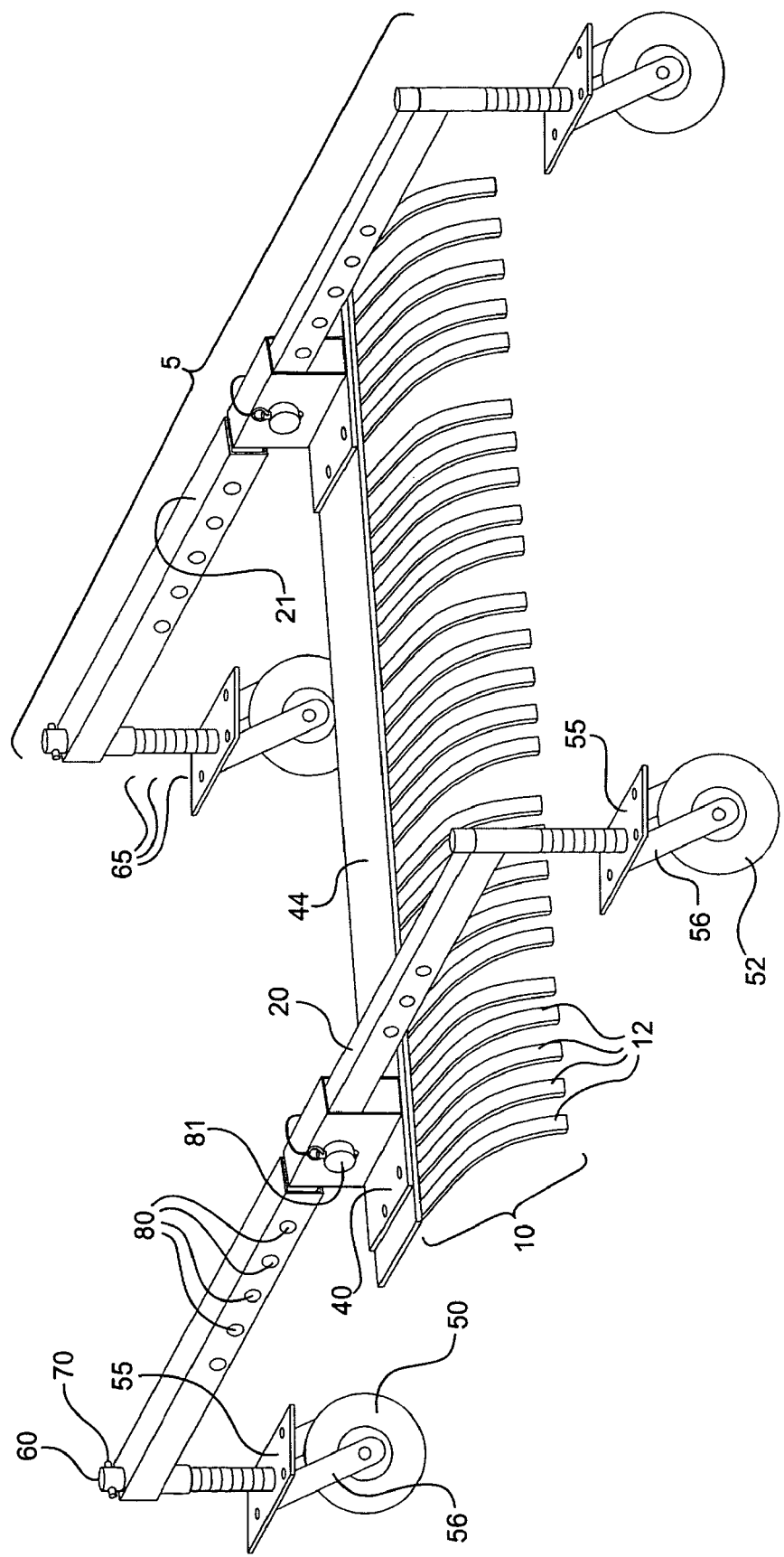
FIG. 4 is a rear perspective view of one embodiment of the invention.

Looking now at the drawings, some preferred aspects of the invention are described. FIG. 4 shows a rear perspective view of a preferred embodiment of the present invention. The invention comprises two side members 5, each side member adapted to be mounted to a side of, and perpendicularly to, a rake 10. Rake 10 may be a commercially available rake. Typically, rake 10 will include a rigid cross brace 44 having mounting holes or attachment hardware near either end thereof. The rake includes a plurality of curved tines 12 attached to and extending below cross brace 44.

When the side members 5 are securely mounted to either side of the rake 10, the assembly forms a rigid H-shaped frame or rack. The rake 10 may, but need not, be mounted near the mid-points of the side members. In some cases, an "off center" mounting position provides advantages. For example, in the embodiment shown in FIG. 4, the rake is mounted toward the rear. This provides additional room in front of the rake for a tractor to attach to the rake, to maneuver it over uneven ground, and to unload soil or other material in front of the rake in preparation for spreading.

In a preferred aspect of the invention, each side member 5 comprises a bar and tube assembly. More specifically, the assembly comprises a hollow metal tube 21 of square or rectangular cross section, within which a telescoping bar or tube 20 is slidably mounted. The outside cross sectional dimensions of bar 20 are slightly smaller than the inside cross sectional dimensions of the tube 21. When bar 20 is telescoped part way into tube 21, the bar and tube may be secured to each other by the use of one or pins or other art recognized attachment means 81 inserted into one or more pin holes 80 in a mounting plate or bracket 40. Multiple pin holes 80 may be included in either the tube 21, bar 20, or both, to provide multiple attachment points for forming side members of variable lengths. Mounting plate or bracket 40 securely attaches each side member/bar and tube assembly to the rake cross brace 44 by way of bolts or other suitable attachment means.

In an alternative embodiment, the side members are of a fixed length and are separately attached to rake cross brace 44 by way of mounting plates or brackets 40 or other attachment means.

As mentioned above, securely mounted to and extending outwardly to each side member 5 is a rake 10 having a plurality of curved tines 12. As will be appreciated by those of ordinary skill, the invention is not limited to the use of any specific rake. Instead, the system can be used with any rake capable of accepting or being joined to the stabilizing system of the invention. A non-limiting list of such rakes include rakes manufactured by Lands Pride and Woods.

In a feature of the invention, a wheel assembly is attached to each end of each side member 5. Each wheel assembly comprises a wheel 50, 52 rotatably mounted to a wheel fork 56, which is mounted to a wheel mount 55 and a vertical shaft 60. One end of each shaft 60 is rotatably mounted to the end of tube 21 or bar 20, and held in place by a pin 70. In one embodiment, the other end of shaft 60 is welded or otherwise attached to wheel mount 55. In another embodiment, the other end of shaft 60 passes through a hole in wheel mount 55 and is welded or otherwise attached to wheel fork 56. Wheel fork 56 may be either fixedly or swivelably attached to wheel mount 55. In a swivelable attachment, shaft 60 passes through a bearing (not shown) that is mounted horizontally between the wheel fork and the wheel mount.

In either embodiment, each shaft 60, and thus each wheel 50, 52 is independently swivelable. A purpose of using four wheels in this manner is to confer a high degree of stability to the rake 10, namely to keep the tines 12 as level with the ground as possible, despite uneven ground conditions.

Figure 5:
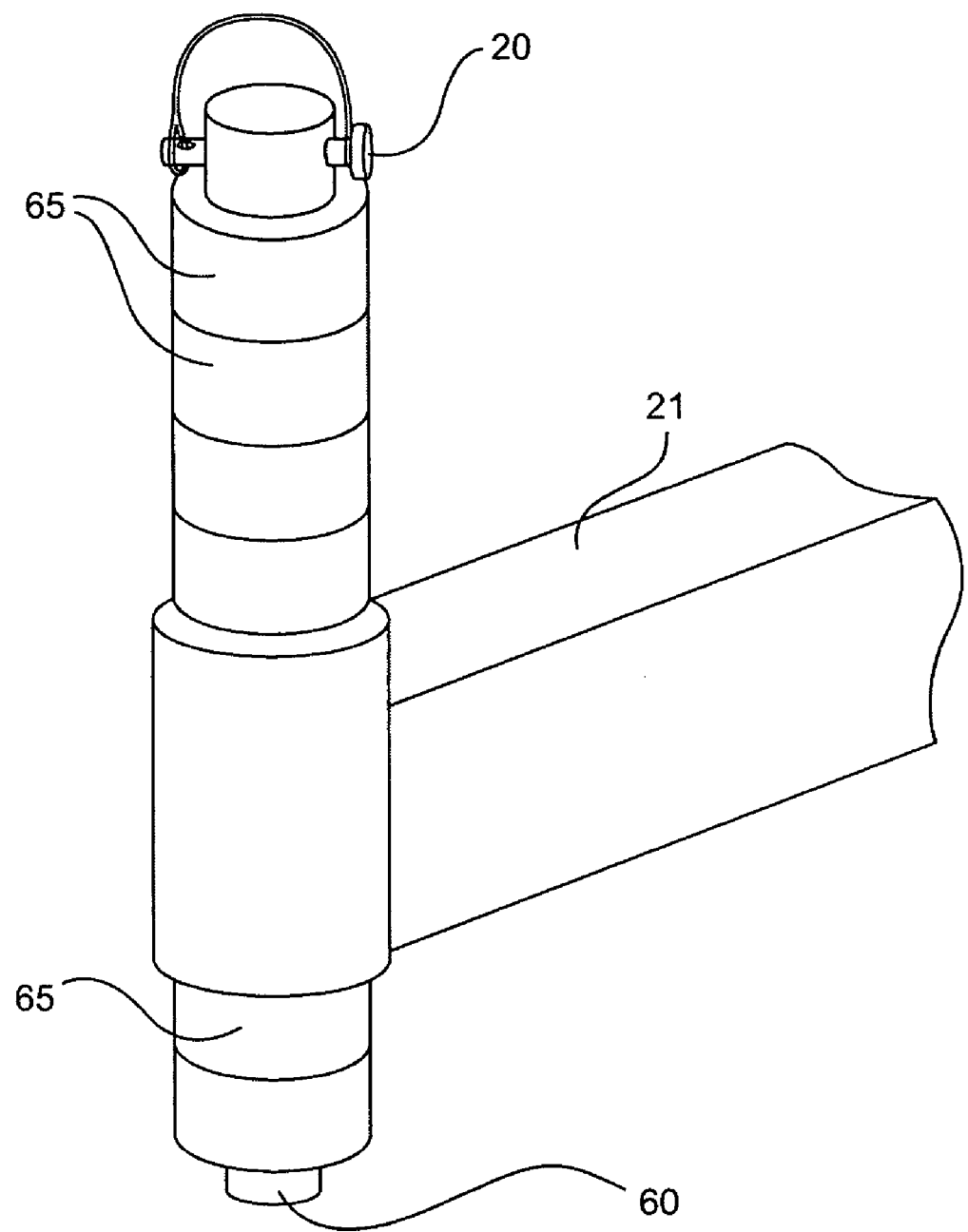
FIG. 5 is a perspective view of a wheel shaft assembly of the invention.

As noted above, each shaft 60 supporting each front wheel 50 is arranged to extend upwardly through an opening near the end of tube 21, and each shaft 60 supporting each rear wheel 52 is arranged to extend upwardly through an opening near the end of bar 20. As shown in more detail in FIG. 5, a pin 70 secures the shaft rotatably within the opening.

In another feature of the invention, each shaft 60 includes a plurality of spacer rings 65 rotatably mounted around the shaft. Rings 65 may be mounted either above or below the tube 21 or bar 20, or both. This arrangement permits each wheel assembly to be vertically adjustable by manually adding or removing one or more spacer rings 65 to or from the shaft 60.

A primary purpose of the rings 65 is to provide a means for the user to easily adjust the height of the rake above the ground whenever desired. Lowering a wheel by adding rings will raise the rake, and raising a wheel by removing rings will lower the rake. In this way, each wheel may be raised or lowered independently.

Preferably, all of the spacer rings 65 are not of the same thickness. In one embodiment, some rings have a thickness of ¼ inch, some have a thickness of ½ inch, and some have a thickness of 1 inch. Several rings of several different thicknesses are included on each shaft. In this way, the user can "mix and match" the rings to adjust the height of the rake to many different positions. Preferably, the inside diameter of the rings is slightly larger than the diameter of shaft 60 to minimize friction, and the outside diameters of all rings are approximately the same to prevent dirt from becoming trapped between the rings. It will be understood that the exact thicknesses and diameters of the rings is not an essential part of the invention and that the dimensions selected will depend upon the needs of the artisan.

Each shaft and wheel assembly is also completely removable from the rack using the pins 70. It is also contemplated that the systems of the present invention will include other art recognized means of facilitating adjustments in the height of the stabilizing system. In an alternative aspect of the invention, the system is provided with shafts 60 which are of a fixed length.

Figure 6:
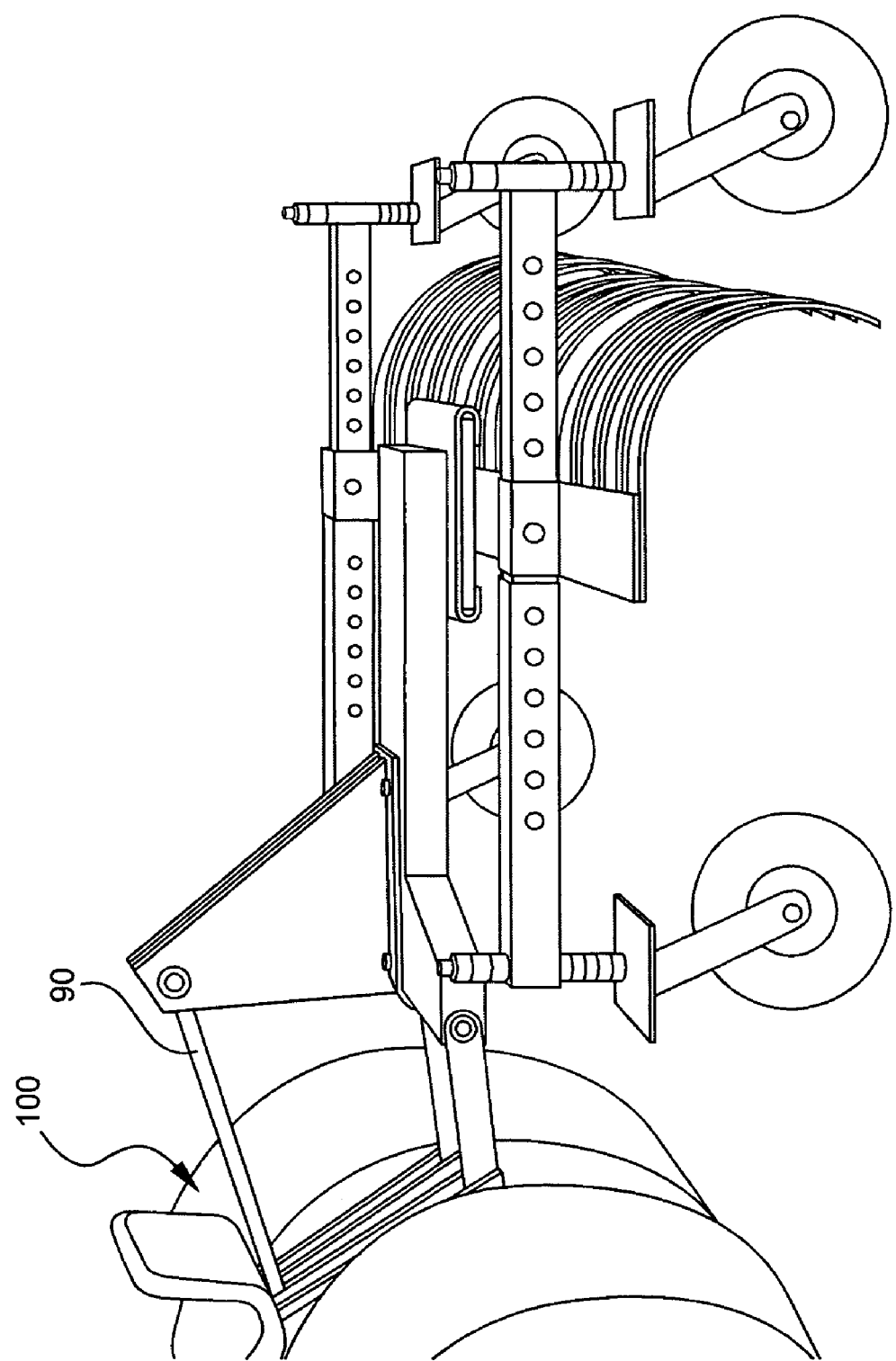
FIG. 6 is a side perspective view of one embodiment of the invention, showing the invention being pulled by a tractor.
Figure 7:
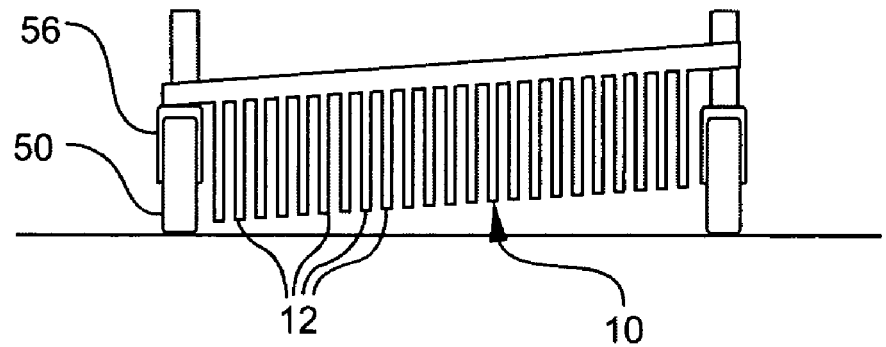
FIG. 7 is a front view of an embodiment of the invention showing one side of the rake being set to a level higher than the other side.
Figure 8:
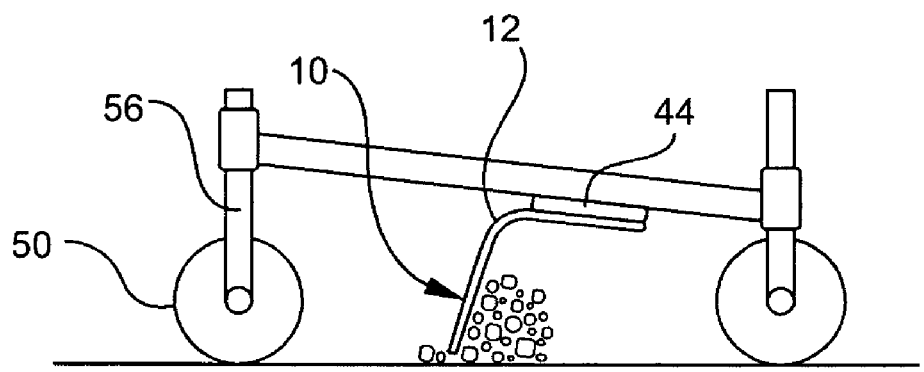
FIG. 8 is a side view of an embodiment of the invention showing the front of the rake being set to a level lower than the back.
Figure 9:
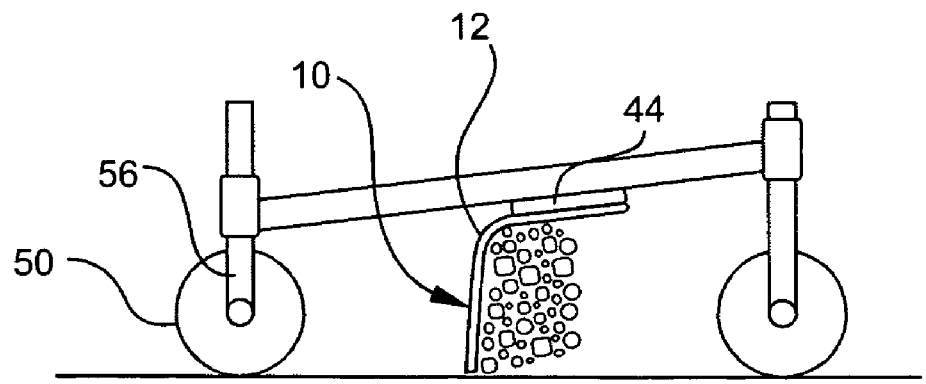
FIG. 9 is a side view of another embodiment of the invention showing the back of the rake being set to a level lower than the front.

In another feature of the invention, because the height of each wheel is independently adjustable, the rake may be adjusted to many different orientations. For example, the rake need not be maintained exactly level with the ground at all times. If the user wishes to enhance drainage on one side of a row, for example, or to produce special ground contour effects, then one side of the rake may be raised higher than the other side by simply adding spacer rings to the shafts 60 on one side only. Also, if the user wishes to raise or lower the rake, it is not necessary for the user to adjust spacer rings at all four shafts. To save time, the user need only adjust rings on the front two or back two shafts. For example, looking at FIG. 4, if the user wishes to raise the rake by ½ inch, then, if desired, the user may simply add 1-inch rings to the front shafts. This will take into account the fact that, in this embodiment, the front wheels are farther away from the rake than the back wheels Looking now at FIG. 6, with the four-wheel rack system of the present invention, an operator can attach the system to a tractor 100 having a three-point hitch 90 in "free wheel" (all-point-motion attachment). Many commercial rakes include mounts for such hitches. In this manner, as the tractor rides over bumps or ruts, the rake remains stable, independent of the tractor's up and down movements. As can be seen in this illustration, the rake is then able to spread material smoothly on the ground, and the depth of the spreaded material will remain even as the tractor moves forward and turns. The vertically adjustable shafts 60 and spacer rings 65 also serve to control the depth of the tine penetration into the ground.

Figure 1:
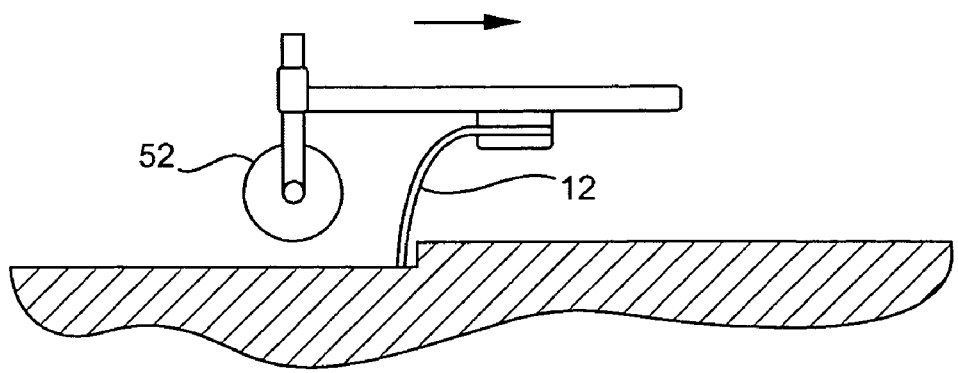
FIG. 1 is a side view of a prior art rake showing a supporting wheel behind the rake.
Figure 2:
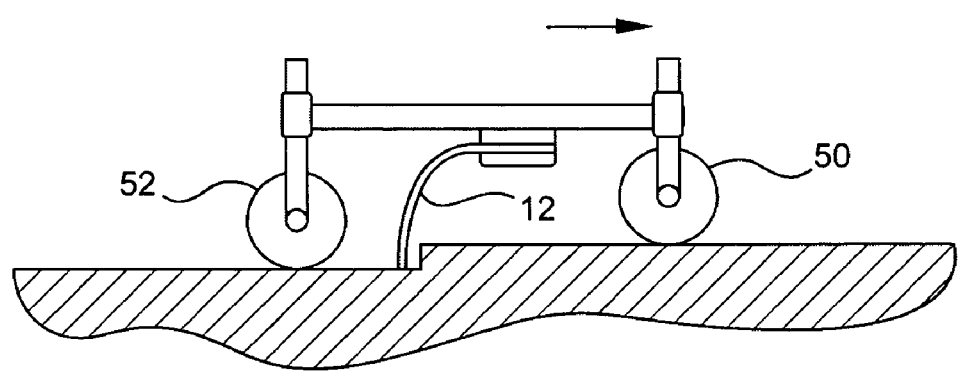
FIG. 2 is a side view of one embodiment of the present invention, with wheels mounted both behind and in front of the rake, and with the wheels set to different levels.

The present invention is useful and versatile in other ways as well. For example, looking now at FIG. 2, which is a side view of the invention, the front wheels are set higher than the lower ends of the rake tines, and the rear wheels are set even with the rake tines. This permits a normal soil scraping and leveling action. In this configuration, the front wheels set the depth of raking, and the rear wheels act as stabilizers only, because the front wheels are on soil that has not been raked, and the rear wheels are set even with the rake. In this way, the operator has complete control of the depth that is being raked.

Figure 3:
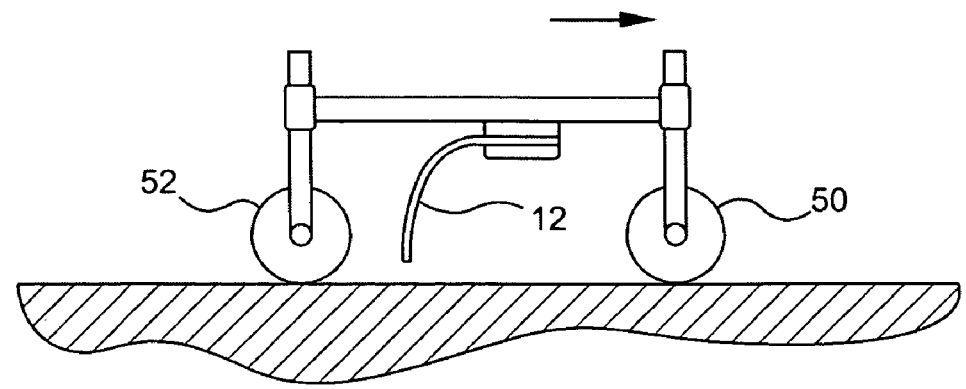
FIG. 3 is a side view of one embodiment of the invention, with wheels mounted both behind and in front of the rake, and with the wheels set lower than the rake for spreading purposes.

In one particular embodiment of the invention, the raking depth can be set as low as ¼ inch for light raking or picking up debris, or the depth can be set deeper, perhaps 1½ inches or more, which is excellent for horse riding arenas. It leaves a smooth level surface. The operator can also set all four wheels lower than the rake tines, as shown in side view in FIG. 3. In this position, the rake becomes, for example, a manure or compost spreader. The manure will roll and tumble in the rake, will fall under the rake as it moves forward, and will be spread smoothly on the ground.

It should also be noted that, because of the telescoping capability of the side member tubes 21 and bars 20 provided in some preferred aspects of the invention (see FIG. 4), the front wheels 50 and rear wheels 52 may be moved closer to or further away from each other, so as to accommodate different size rakes, or to achieve special landscaping effects. The telescoping arrangement also permits the bars 20 to be completely separated from the tubes 21, to facilitate easy removal of the wheels from the rake without unbolting the mounting plate or bracket 40.

If the operator wishes to take the wheels off and use the rake without the wheels, the operator can simply pull the pins 81 or otherwise disengage the attachment means 81, and the side tubes and bars along with the wheels come off.

When the rake is not in use, the wheels may be moved to a position lower than the rake, and then the rake assembly may be removed from the tractor and wheeled away. When ready to use again, it is not necessary to line up the tractor perfectly with the rake, because since it has its own wheels, the rake may be hooked up to the tractor with ease.

While the invention has been described herein with reference to certain preferred embodiments, these embodiments have been presented by way of example only, and not to limit the scope of the invention.

What is claimed is:

1. A stabilized, wheeled rake comprising:
   (a) a rake member to which are attached a row of tines;
   (b) a three-point hitch mounted to the rake member perpendicular to the row of tines, the three-point hitch being suitable for attachment to a vehicle;
   (c) two elongated side members mounted on either side of and perpendicularly to the rake member, such that the side members and rake member together form an H-shaped frame with four corners, and wherein each side member comprises a telescoping bar of rectangular cross-section and slidably mounted within a rigid hollow member of rectangular cross-section, so as to permit each side member to be horizontally adjustable; and
   (d) four wheels, each wheel mounted to a vertical shaft that is swivelably mounted at each corner of the frame, each shaft being independently and vertically adjustable by means of a plurality of spacer rings of varying thicknesses placed around the shaft, the wheels positioned such that the wheels, frame and three-point hitch stabilize the rake member in a position approximately level relative to a ground surface while the rake is being pulled across the ground surface by the vehicle.

2. A stabilizing system for a wheeled rake, comprising:
   (a) two elongated side members, each side member adapted to be mounted to a side of and perpendicularly to a rake member, the rake member being suitable for attachment to a three-point hitch and wherein each side member comprises a telescoping bar of rectangular cross-section and slidably mounted within a rigid hollow member of rectangular cross-section, so as to permit each side member to be horizontally adjustable; and
   (b) four wheels, each wheel mounted to a vertical shaft that is swivelably mounted at an end of each side member, each shaft being independently and vertically adjustable by means of a plurality of spacer rings of varying thicknesses placed around the shaft, the wheels positioned such that the wheels, side members and three-point hitch stabilize the rake member in a position approximately level relative to a ground surface while the rake is being pulled across the ground surface by a vehicle.

* * * * *